(No Model.)
D. GOFF.
SNOW AND ICE GUARD FOR HORSES' HOOFS.
No. 351,633. Patented Oct. 26, 1886.
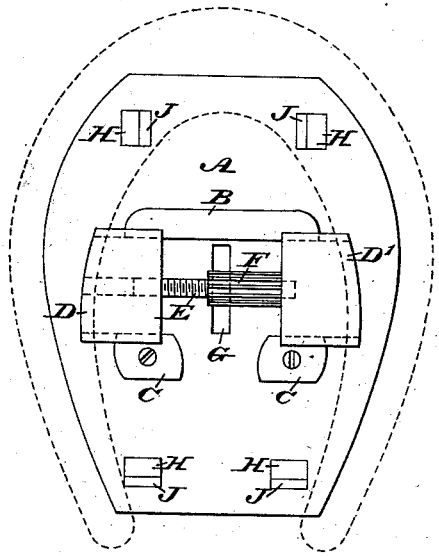
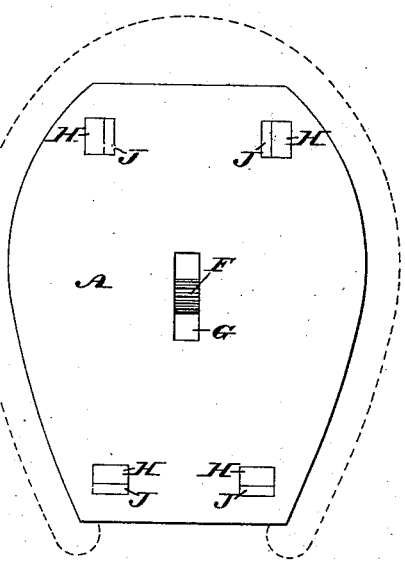
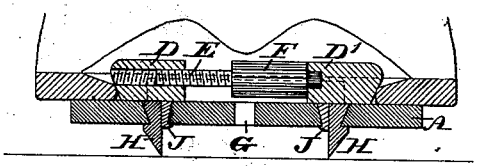
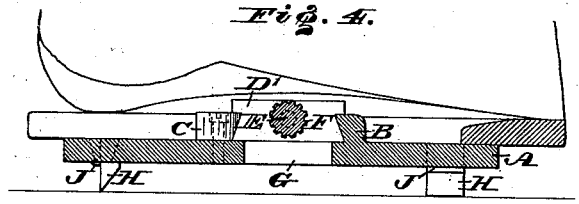
WITNESSES:
L. Douville
W. F. Kirchen
INVENTOR:
Daniel Goff
BY John A. Wieder
ATTORNEY.

United States Patent Office.

DANIEL GOFF, OF MILLVILLE, NEW JERSEY, ASSIGNOR OF THREE-FOURTHS TO TAYLOR BROTHERS, OF CAMDEN, AND JAMES L. SMITH, OF MILLVILLE, NEW JERSEY, AND WILLIAM H. MELCHER, OF PHILADELPHIA, PA.

SNOW AND ICE GUARD FOR HORSES' HOOFS.

SPECIFICATION forming part of Letters Patent No. 351,633, dated October 26, 1886.

Application filed March 6, 1886. Serial No. 194,316. (No model.)

*To all whom it may concern:*

Be it known that I, DANIEL GOFF, a citizen of the United States, residing at Millville, in the county of Cumberland, State of New Jersey, have invented a new and useful Improvement in Snow and Ice Guards for Hoofs of Horses and other Animals, which improvement is fully set forth in the following specification and accompanying drawings, in which—

Figure 1 represents a top view of a guard embodying my invention. Fig. 2 represents a bottom plan thereof. Fig. 3 represents a transverse section thereof. Fig. 4 represents a longitudinal section thereof.

Similar letters of reference indicate corresponding parts in the several figures.

My invention consists of novel means for securing a snow and ice guard to the hoof of an animal, as will be hereinafter fully set forth. It also consists of a novel fastening for the spurs or calks of the guard.

Referring to the drawings, A represents a plate, formed of suitable metal, adapted to be rested against the under side or tread of a horseshoe and close the space within the sides of the shoe, whereby ice and snow are prevented from reaching the hoof of the animal. On the upper side of the plate are lugs B C, the former, B, of which is firmly secured or formed with said plate, the latter, C C, being detachable, so as to provide for the wear thereof. These constitute guides for sliding blocks D D', whose motion is transversely or in the narrow direction of the hoof, said blocks being formed of metal. Interposed between the blocks is a screw, E, one end whereof is fitted to the block D, and the other end has a head, F, which is stepped in the block D', access to said head being had through a slot, G, in the plate A, it being noticed that as the blocks and screw are on the upper side of the plate A they are prevented from coming in contact with the ground, snow, ice, &c.

When the device is to be secured to a shoe, the screw E is rotated to cause the blocks D D' to approach each other, so that they may be introduced between the opposite sides of the shoe and into the face of the hoof. The screw E is then rotated, whereby the blocks move in opposite directions, and are clamped against the inner walls of the sides of the shoe, as most plainly shown in Fig. 3, and thus the plate is firmly held on the shoe.

When removal of the shoe is desired, the screw E is rotated in order to relieve the blocks and cause them to move inwardly or toward each other, whereby they clear the walls of the shoe, and the plate may be displaced.

For convenience of operation of the screw the head F is toothed or serrated, or may be squared, in order to be properly grasped by a key, wrench, or other proper implement introduced through the slot G. The contiguous sides of the lugs or guides B C and blocks D D' are dovetailed or tongued and grooved, in order to prevent vertical displacement of the blocks, and the sides of the blocks which come in contact with the shoe are inclined, so as to overhang the walls of the shoe and produce a wedging effect therewith, whereby the guard is reliably connected with the shoe. In the plate A are openings of wedge shape to receive spurs or calks H, the widest part of said openings being above, said openings being sufficiently wide to receive the shanks of the spurs and fastening-keys J, said shanks and keys being of wedge shape. When the shanks and keys are in position, the lower ends of the keys are hammered or headed, and thus the spurs are firmly connected with the plate and prevented from vertical displacement. (See Fig. 3.) Should it be desired to displace a calk, the head of the key is removed by cutting, filing, &c., and thus the key can be withdrawn from above and the spur from below.

Matter described in this specification or shown in the accompanying drawings and not claimed herein is reserved, another application for improvement in ice-guards having been filed by me this same date and of Serial No. 194,317.

Having thus described my invention, what I claim as new, and desire to secure by Letters Patent, is—

1. The slotted plate A, having transverse lugs B C C, the latter, C C, being detachable, in combination with the blocks D D', and screw E, with head F, the said lugs B C C forming guides for the said blocks D D', and the said screw E operating in the threaded block D, and having its other end journaled in the block D', the head F bearing against the same, all substantially as and for the purpose set forth.

2. A plate having transverse lugs attached thereto arranged in two parallel rows, in combination with two blocks fitted in said lugs so as to be guided thereby, one of said blocks having swiveled thereto the head of a screw, and the other block having a threaded opening and adapted to receive the said screw, and spurs secured in said plate, all substantially as and for the purpose set forth.

DANIEL GOFF.

Witnesses:
 JOHN A. WIEDERSHEIM,
 A. P. GRANT.